US010572973B2

(12) United States Patent
Kang et al.

(10) Patent No.: US 10,572,973 B2
(45) Date of Patent: Feb. 25, 2020

(54) DISPLAY DEVICE AND METHOD OF CONTROLLING SAME

(71) Applicant: SAMSUNG ELECTRONICS CO., LTD., Suwon-si (KR)

(72) Inventors: Jin-sung Kang, Hwaseong-si (KR); Jason Yong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 87 days.

(21) Appl. No.: 15/752,069

(22) PCT Filed: Jul. 18, 2016

(86) PCT No.: PCT/KR2016/007769
§ 371 (c)(1),
(2) Date: Feb. 12, 2018

(87) PCT Pub. No.: WO2017/061684
PCT Pub. Date: Apr. 13, 2017

(65) Prior Publication Data
US 2018/0300853 A1 Oct. 18, 2018

(30) Foreign Application Priority Data
Oct. 5, 2015 (KR) .......................... 10-2015-0139638

(51) Int. Cl.
*G06T 3/00* (2006.01)
*G06T 3/40* (2006.01)
(Continued)

(52) U.S. Cl.
CPC .................. *G06T 3/40* (2013.01); *G06T 7/11* (2017.01); *G06T 7/136* (2017.01); *G06T 7/20* (2013.01); *H04N 5/262* (2013.01)

(58) Field of Classification Search
None
See application file for complete search history.

(56) References Cited

U.S. PATENT DOCUMENTS 5,731,819 A * 3/1998 Gagne .................... G06T 17/20
345/647
8,768,097 B2 7/2014 Wang et al.
(Continued)

FOREIGN PATENT DOCUMENTS

KR  10-2007-0033541 A  3/2007
KR  10-2008-0028973 A  4/2008
(Continued)

OTHER PUBLICATIONS

Collomosse et al., "Rednering cartoon-style motion cues in post-production video," Graphical Models 67 (2005) 549-564 (Year: 2005).*
(Continued)

*Primary Examiner* — Soo Shin
(74) *Attorney, Agent, or Firm* — Sughrue Mion, PLLC

(57) ABSTRACT

Disclosed are a display device and a method of controlling a display device, the display device including: an image processor configured to process an image; a display configured to display the image processed by the image processor; and a controller configured to determine a moving direction of at least one object having mobility in the image, and controls the image processor so that at least a partial region of the image can be stretched and displayed based on the determined moving direction.

10 Claims, 23 Drawing Sheets

(51) Int. Cl.
　　　*G06T 7/11*　　　(2017.01)
　　　*G06T 7/136*　　(2017.01)
　　　*G06T 7/20*　　　(2017.01)
　　　*H04N 5/262*　　(2006.01)

(56) References Cited

U.S. PATENT DOCUMENTS

| | | | |
|---|---|---|---|
| 9,001,185 B2 | 4/2015 | Saitou et al. | |
| 2008/0316328 A1* | 12/2008 | Steinberg | G06K 9/036 |
| | | | 348/222.1 |
| 2009/0268089 A1* | 10/2009 | Mori | G09G 3/3611 |
| | | | 348/459 |
| 2010/0002133 A1* | 1/2010 | Ueno | G09G 3/20 |
| | | | 348/452 |
| 2010/0111429 A1 | 5/2010 | Wang et al. | |
| 2011/0157301 A1 | 6/2011 | Saitou et al. | |
| 2013/0229409 A1 | 9/2013 | Song et al. | |

FOREIGN PATENT DOCUMENTS

| | | |
|---|---|---|
| KR | 10-2009-0124317 A | 12/2009 |
| KR | 10-2013-0078676 A | 7/2013 |

OTHER PUBLICATIONS

Tsai et al., "Segmenting focused objects in complex visual images," Pattern Recognition Letters 19 (1998) 929-940 (Year: 1998).*
Search Report dated Nov. 2, 2016, issued by the International Searching Authority in counterpart International Patent Application No. PCT/KR2016/007769 (PCT/ISA/210).

* cited by examiner

FIG. 10
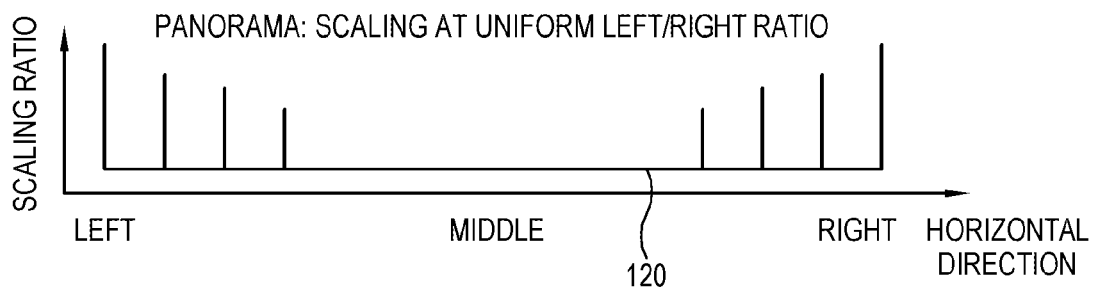
(a)
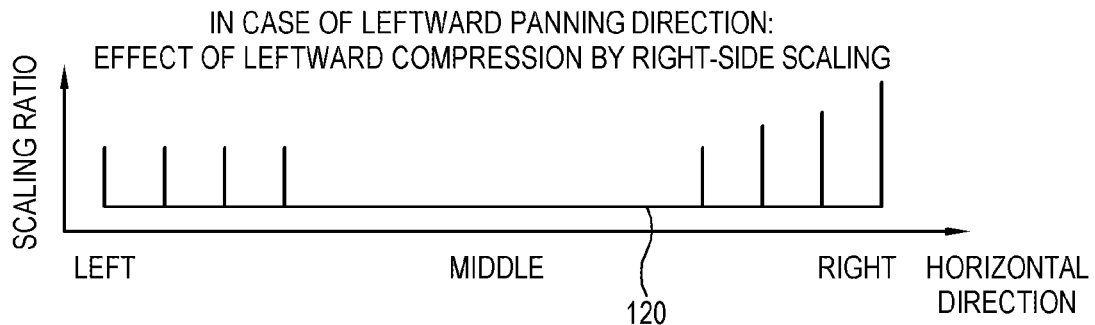
(b)
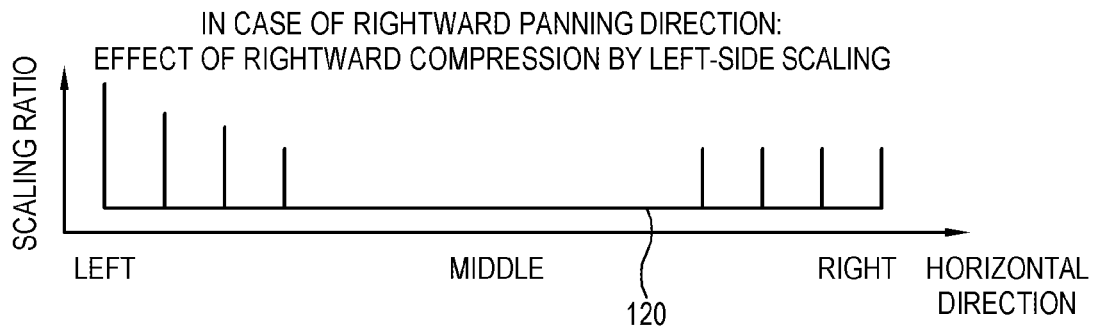
(c)

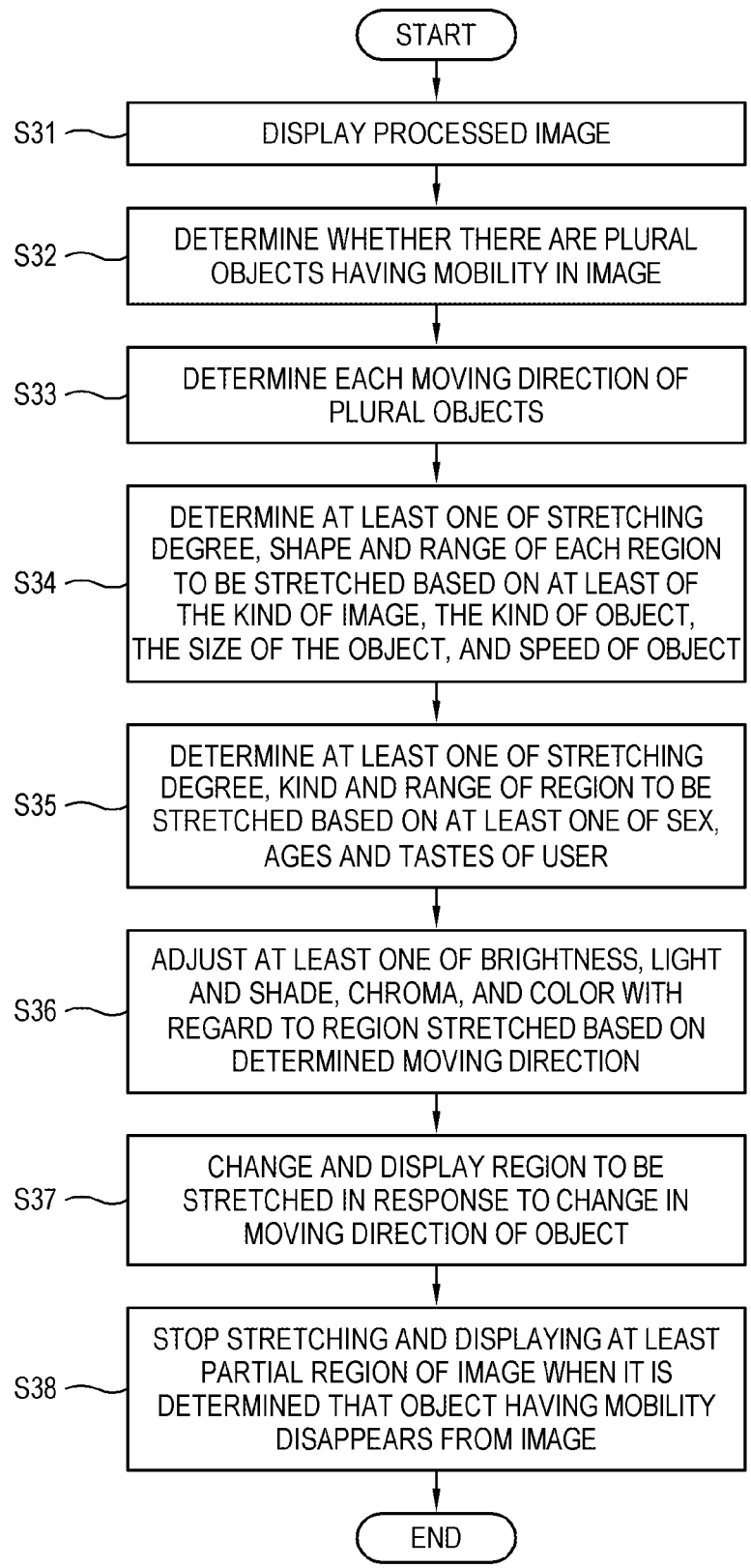

DISPLAY DEVICE AND METHOD OF CONTROLLING SAME

TECHNICAL FIELD

The present invention relates to a display device and a method of controlling the same, in which an object having mobility in an image is displayed with increased stereoscopic effect and the enlivening effect.

BACKGROUND ART

When an object moves in an image displayed on a screen of a display device, a moving direction of the object is taken into account to make an aspect ratio or the like be symmetrical with regard to the up, down, left and right sides of the screen. Like this, when the aspect ratio of the screen is made symmetrical, stereoscopic effect and the enlivening effect of the moving object is lessen. Accordingly, there is a need of a method of increasing the stereoscopic effect and the enlivening effect of the object moving in the image displayed on the screen.

DISCLOSURE

Technical Problem

Accordingly, an object of the present invention is to provide a display device and a method of controlling the same, which can increase mobility of an object moving in an image.

Technical Solution

According to an aspect of an exemplary embodiment, there is provided a display device including: an image processor configured to process an image; a display configured to display the image processed by the image processor; and a controller configured to determine a moving direction of at least one object having mobility in the image, and controls the image processor so that at least a partial region of the image can be stretched and displayed based on the determined moving direction.

The controller may determine a focused one of the objects having mobility in the image, and stretch the region based on the moving direction of the determined one.

The controller may determine at least one among a stretching degree, shape and range of the region to be stretched based on at least one among the kind of image, the kind of object, the size of the object and a speed of the object.

The controller may change the region to be stretched corresponding to change in the moving direction of the object.

The controller may control the image processor to gradually increase at least one of a stretching degree and a range for a plurality of regions of the image based on the moving direction of the object.

The controller may stretch at least a partial region of the image by a preset ratio with regard to at least one of the objects.

When there are a plurality of objects having mobility in the image, the controller may control the region to be stretched and displayed corresponding to each moving direction of the plurality of objects.

The controller may control the plurality of regions to be stretched based on at least one of a stretching degree, shape and range.

According to an aspect of another exemplary embodiment, there is provided a method of controlling a display device, the method including: displaying a processed image; determining a moving direction of at least one object having mobility in the image; and stretching and displaying at least a partial region of the image based on the determined moving direction.

The method may further include determining a focused one of the objects having mobility in the image; and stretching the region based on the moving direction of the determined one.

The method may further include determining at least one of a stretching degree, shape and range of the region to be stretched based on at least one among the kind of image, the kind of object, the size of the object and a speed of the object.

The stretching and displaying may include changing the region to be stretched corresponding to change in the moving direction of the object.

The stretching and displaying may include gradually increasing at least one of a stretching degree and a range for a plurality of regions of the image based on the moving direction of the object.

The stretching and displaying may include stretching at least a partial region of the image by a preset ratio with regard to at least one of the objects.

The stretching and displaying may include stretching and displaying each region corresponding to each moving direction of a plurality of objects and regions when the plurality of objects having mobility are present in the image.

Advantageous Effects

According to the present invention, there are provided a display device and a method of controlling the same, which can increase mobility of an object moving in an image.

DESCRIPTION OF DRAWINGS

FIG. 10 illustrates an example of a scaling ratio with regard to a panning direction of an image on a screen in a display device according to one embodiment of the present invention, FIGS. 22 and 23 are control flowcharts of showing operations of a display device according to one embodiment of the present invention.

BEST MODE

Below, embodiments of the present invention will be described in detail with reference to accompanying drawings.

Figure 1:
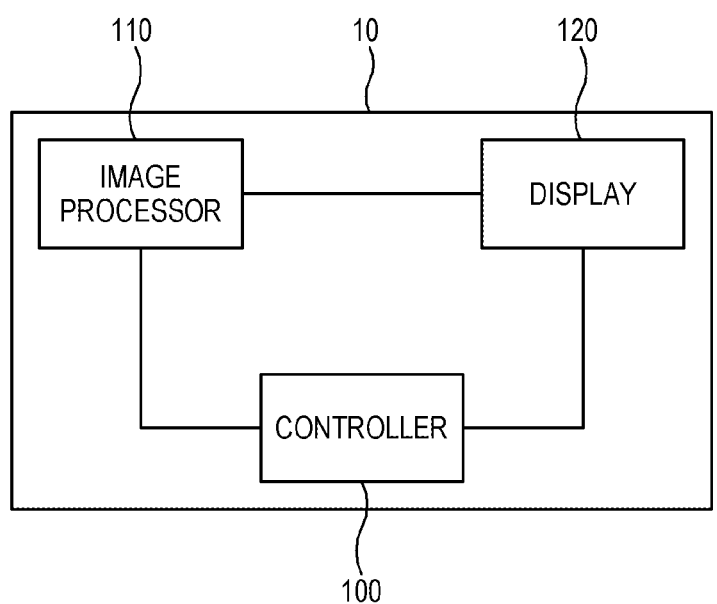
FIG. 1 is a block diagram of a display device according to one embodiment of the present invention.

FIG. 1 is a block diagram of a display device 10 according to one embodiment of the present invention. The display device 10 in this embodiment includes an image processor 110 for processing an image, and a display 120 for displaying the image processed by the image processor 110. There are no limits to the kinds of image processing processes performed in the image processor 110, and the image processing processes may for example include de-multiplexing to divide a predetermined signal into signals according to characteristics, decoding performed corresponding to an image format of an image signal, de-interlacing to convert an interlaced-type image signal into a progressive-type image signal, noise reduction, detail enhancement, frame refresh rate conversion and the like to improve image quality. To this end, the image processor 110 may include a decoder (not shown) to decode a source image in accordance with image formats of an encoded source image, and a frame buffer (not shown) to store the decoded source in units of frame. The image processor 110 may be materialized by an image processing board (not shown) that includes a system-on-chip where many functions are integrated, or a printed circuit board where individual elements for independently processing each of such processes are mounted, and internally provided in the display device 10. The image processor 110 performs various preset image processing processes with regard to a broadcast signal including an image signal received in a receiver (not shown), and a source image including an image signal received from an image source (not shown). The image processor 110 outputs an image signal subjected to such a process to the display device 10, so that the display device 10 can display the processed broadcast signal and the processed source image. The display 120 may display an image based on an image signal output from the image processor 110. There are no limits to the types of the display 120, and the display 120 may be materialized by various display types such as liquid crystal, plasma, light-emitting diode (LED), organic light-emitting diode (OLED), surface-conduction electron-emitter, carbon nano-tube, nano-crystal, etc. The display 120 displays an image based on an image signal processed by the image processor 110. There are no limits to a display method of the display 120, and the display 120 may use a display method of a liquid crystal display (LCD), a plasma display panel (PDP), an organic light emitting diode (OLED), or the like. In this case, the display 120 may include an LCD panel, a PDP panel, an OLED panel, or the like. The display 120 may display an image and a color calibration image. The display 120 may include a display panel for displaying an image, and a panel driver for processing an image signal to be displayed on the display panel, and there are no limits to its detailed materialization. An image signal receives from an external input source through an interface may be subjected to the image processing processes such as decoding, de-interlacing, scaling and the like and then displayed on the display 120. A controller 100 may control general elements in the display device 10. The controller 100 determines a moving direction of at least one object having mobility in an image, and controls the image processor 110 to display an image, at least a partial region of which is stretched based on the determined moving direction.

Figure 2:
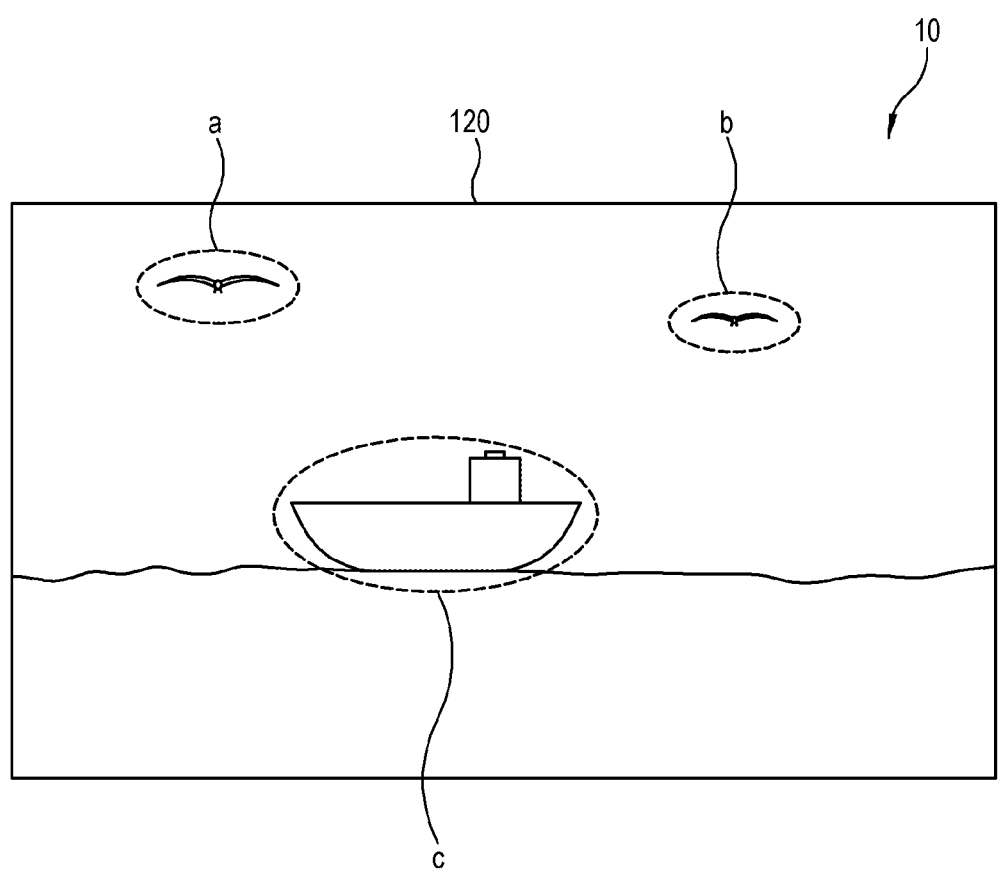
FIG. 2 illustrates an example where a plurality of objects having mobility is displayed on a screen in a display device according to one embodiment of the present invention.

FIG. 2 illustrates an example where a plurality of objects having mobility is displayed on a screen in a display device 10 according to one embodiment of the present invention. On a screen 120 of the display device 10 is displayed a plurality of moving objects a, b and c. The controller 100 of the display device 10 may determine whether an object and a background are present having mobility in an image. Further, the controller 100 determines whether to stretch a region corresponding to which object among the plurality of objects a, b and c determined as having mobility. Further, the controller 100 may determine whether an object is focused in an image and then stretch only a region corresponding to the focused object. Further, the controller 100 may stretch the focused object and the region. Further, the controller 100 may stretch the object and the region to thereby increase stereoscopic effect and the enlivening effect of the moving object and region when it is determined that the object and the region move at preset speed or higher. Referring back to FIG. 2, the focused object c moves leftward. In this case, if the object c is displayed with a stretched right region, the mobility of the object c stands out, thereby increasing the stereoscopic effect and the enlivening effect of the object c.

Figure 3:
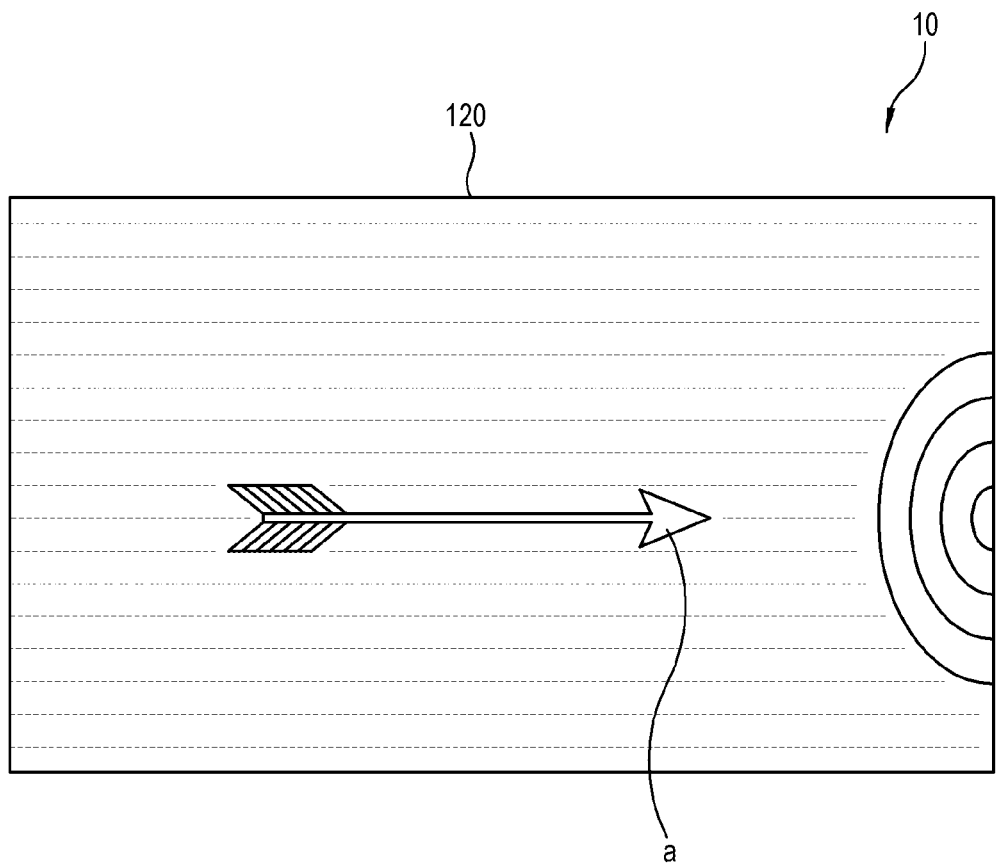
FIG. 3 illustrates an example where an arrow having mobility moves toward a target on a screen in a display device according to one embodiment of the present invention.

FIG. 3 illustrates an example where an arrow having mobility moves toward a target on a screen in a display device 10 according to one embodiment of the present invention. As shown in FIG. 3, to give an effect on moving toward a target, an arrow a is displayed with only a panning effect as if the surrounding background of the arrow a moves reversely. Besides, if a screen is subjected to asymmetric scaling as well as the panning effect, it is possible to provide an image more improved in the stereoscopic effect and the enlivening effect of the arrow a.

Figure 4:
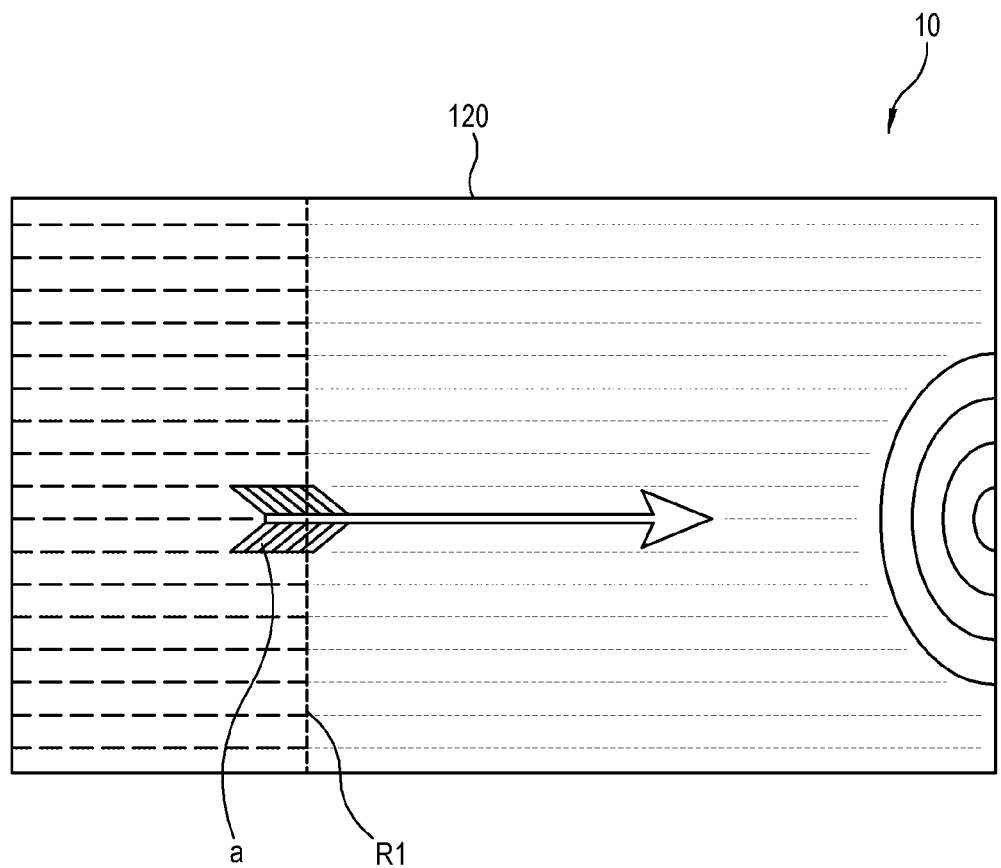
FIGS. 4 to 7 illustrates examples where a partial region of a screen is stretched to increase mobility of an arrow moving toward a target on the screen in a display device according to one embodiment of the present invention.

FIGS. 4 to 7 illustrates examples where a partial region of a screen is stretched to increase mobility of an arrow moving toward a target on the screen in a display device 10 according to one embodiment of the present invention. As shown in FIG. 4, when a rear region R1 of the arrow a in FIG. 3 is stretched and displayed, the arrow a is displayed with increased mobility, thereby improving the stereoscopic effect and the enlivening effect of the arrow a. Such a stretch region R1 is formed to stretch the whole vertical width of the screen. Herein, the stretch region R1 of the arrow a may be increased in a scaling ratio, and a frontward region around the target for which the arrow a heads may be decreased in the scaling ratio. Further, the head of the arrow a may be increased in the scaling ratio. Like this, when the rear region and front region of the arrow a, and the front of the object are changed in the scaling ratio, it is possible to increase effects of the mobility, directionality, moving speed, etc. of the arrow a.

Figure 5:
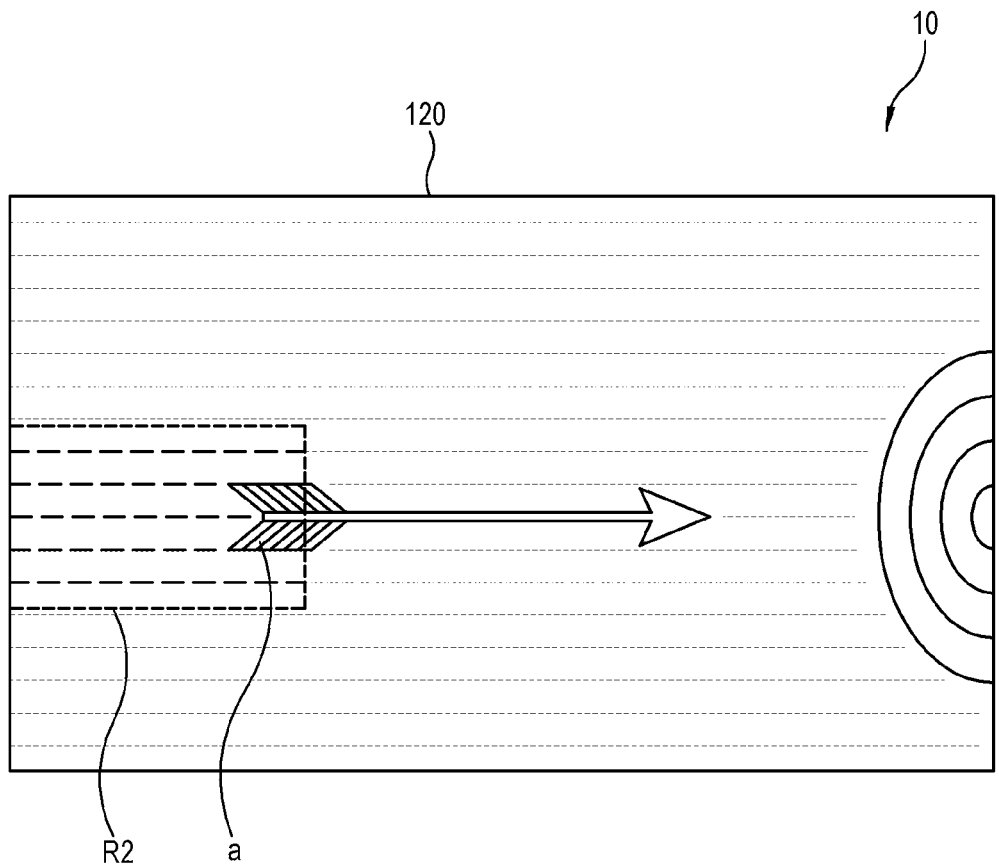

In FIG. 5, a stretch region R2 is formed to stretch only a larger vertical width rather than the vertical width of the arrow a. In other words, the vertical width of the stretch region R2 is varied depending on the vertical width of the arrow a, i.e. the object having mobility. The vertical width of the stretch region R2 may be determined based on the vertical width of the object having mobility, and may be also determined based on the moving speed of the object having mobility. Further, the vertical width of the stretch region may be determined in accordance with the kinds of image. In addition, the vertical width of the stretch region may be determined in accordance with the kinds of object having mobility. Herein, the vertical width of the region to be stretched may be determined in accordance with sex, ages and tastes of a user. Further, at least one of a stretching degree, a stretching shape, a stretching range as well as the vertical width of the region to be stretched may be determined based on at least ono of the kind of image, the kind of object having mobility, the size of the object having mobility, and the speed of the object having mobility. In addition, at least one of the stretching degree, the stretching kind and the stretching range of the region to be stretched may be determined based on at least one of the sex, ages and tastes of a user.

Figure 6:
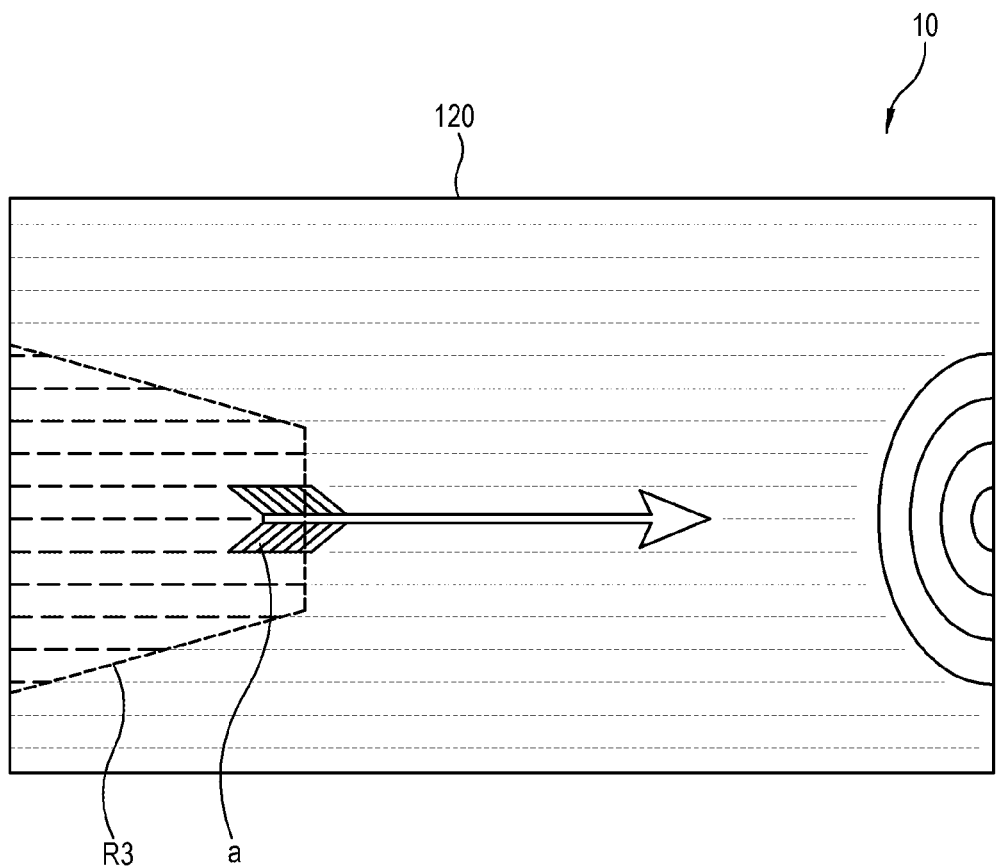

Unlike the rectangular shape of the stretch region R2 shown in FIG. 5, a stretch region R3 shown in FIG. 6 is formed to have a trapezoidal shape that becomes gradually wider in a backward direction. The trapezoidal stretch region R3 more improves a speedy effect of the arrow a than the rectangular stretch region R2. Further, when the size of the arrow a is increasing on an image, the trapezoidal stretch region R3 further improves the mobility of the arrow a. Further, at least one of the stretching degree and the range of the plurality of regions in the trapezoidal stretch region R3 may be gradually increased based on the moving direction of the arrow a. As necessary, a user may set the shape of the stretch region. Further, the shape of the stretch region may include various shapes such as an inverted trapezoid, etc. Further, at least one of the brightness, light and shade, chroma, and color may be adjusted with regard to the stretch region.

Figure 7:
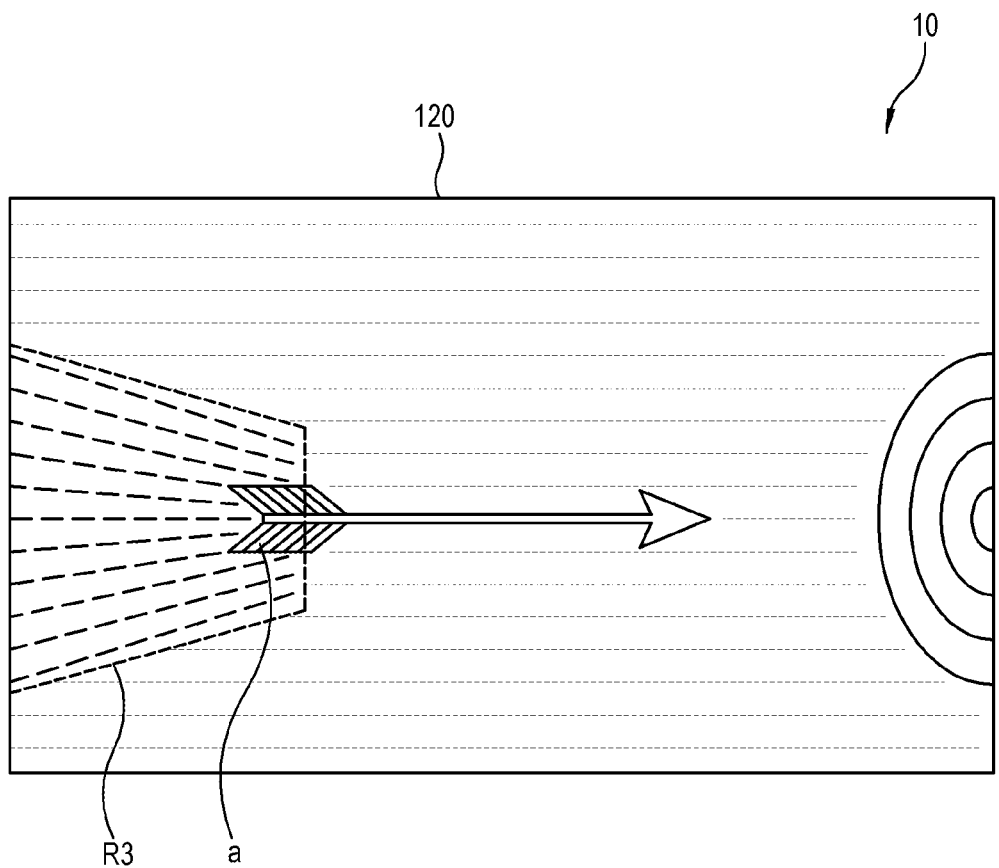

Unlike the stretch region R3 of FIG. 6 having a horizontal panning direction corresponding to left and right directions of a screen, the stretch region R3 of FIG. 7 has a panning direction corresponding to a trapezoidal shape that gradually becomes wider in a backward direction. Since the stretch region of the arrow a has an effect on spreading out up and down, the mobility of the arrow a is further enhanced. Such a panning direction may be determined in accordance with the kinds of image or the kinds of object. Herein, when it is determined that a region and an object having mobility disappear from an image while the image is displayed with at least a partial stretch region, the image may be displayed without stretching the partial region. Further, even though the object is present within an image, the stretch region may be not displayed when a moving speed of an object having mobility is slower than a preset moving speed. Further, the stretch region may be set when the size of object having mobility is smaller than a preset size.

Figure 8:
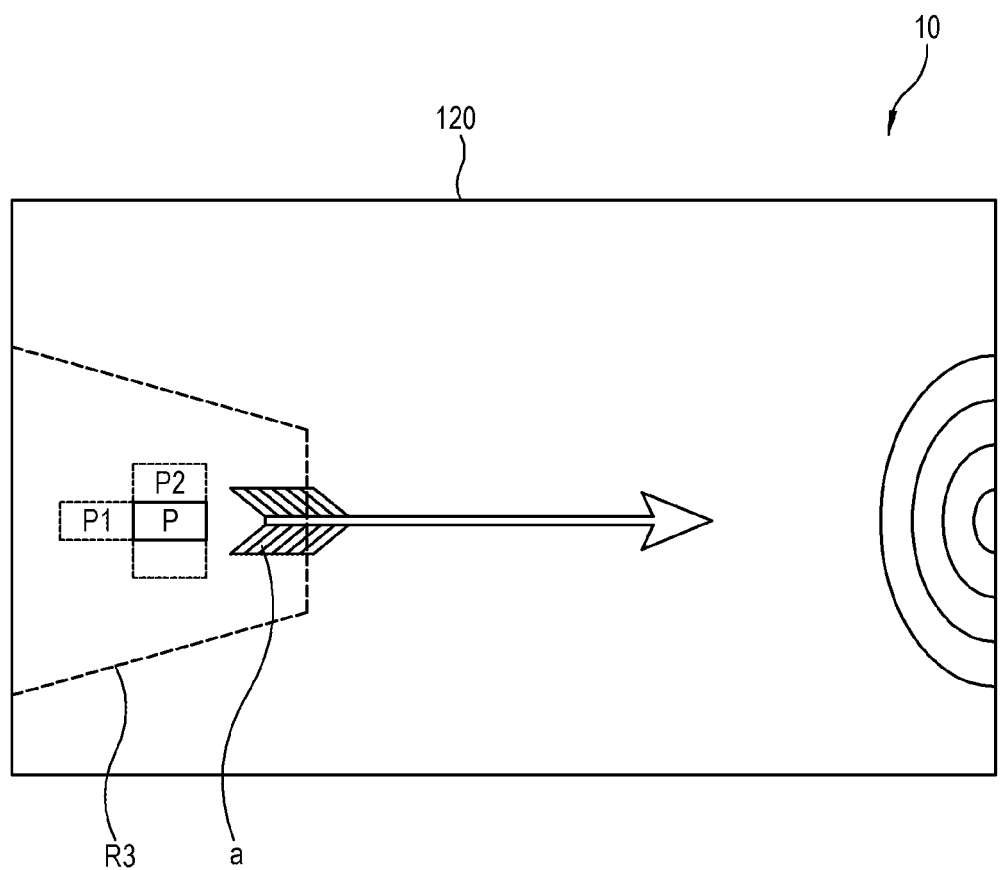
FIG. 8 illustrates an example of one method of stretching a region on a screen in a display device according to one embodiment of the present invention.

FIG. 8 illustrates an example of one method of stretching a region on a screen in a display device 10 according to one embodiment of the present invention. Stretching the region on the screen is setting pixels of a region to be stretched to be different from pixels of a region not to be stretched among pixels in the display 120. For example, a non-stretch region may be displayed with 500 pixels, whereas a stretch region may be displayed with 1,000 pixels. As shown in FIG. 8, the method of adjusting the degree and kind of stretching the stretch region R3 and the range of the region may be performed in horizontal and vertical directions with regard to pixels. The stretch region R3 is made by arranging more pixels in the horizontal direction than those in the vertical direction. Like this, it is possible to adjust the range, degree and kind of region to be stretched by arranging the pixels in the horizontal and vertical directions.

Figure 9:
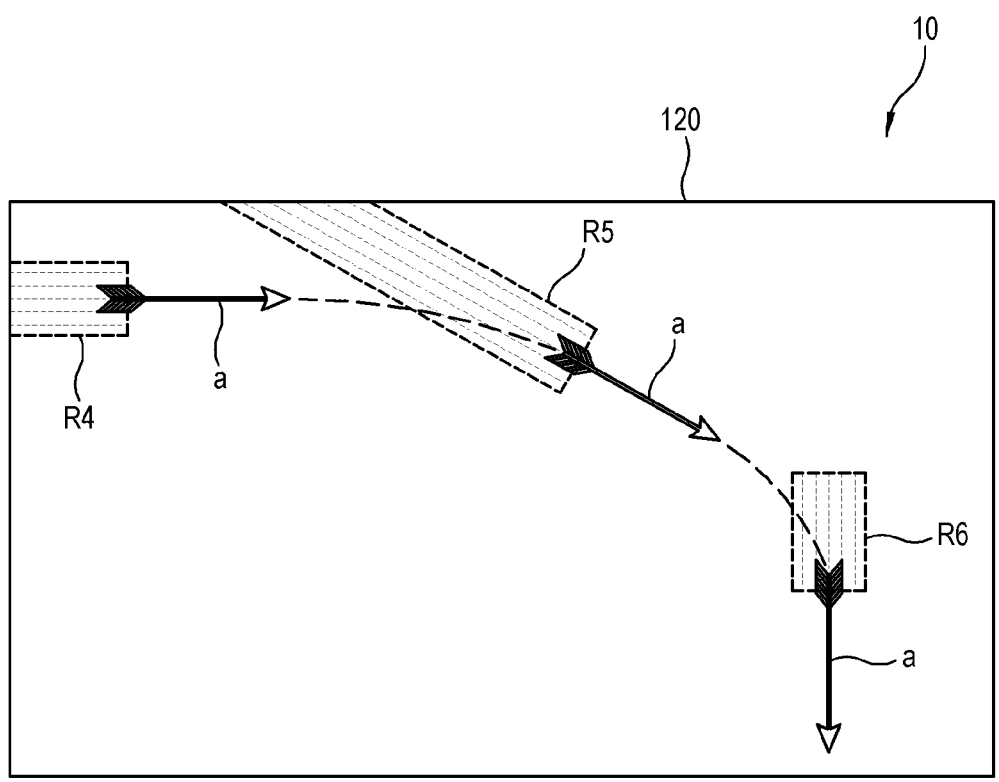
FIG. 9 illustrates an example where a stretch region is changed as a moving direction of a moving arrow is changed on a screen in a display device according to one embodiment of the present invention.

FIG. 9 illustrates an example where a stretch region is changed as a moving direction of a moving arrow is changed on a screen in a display device 10 according to one embodiment of the present invention. Within an image, an object having mobility does not always move in only one direction. When the object moves only in one direction, there are no changes in the direction of the stretch region. However, as shown in FIG. 9, a stretch region R4 is formed in parallel with a rear region of the arrow a while the arrow a moves rightward from an upper left side of the screen. Then, a stretch region R5 is changed in shape and direction when the arrow a moves changing a direction toward a lower left side of the screen along a dotted line. In result, when the moving direction of the arrow a is changed toward a lower side of the screen, a stretch region R6 is vertically oriented. Like this, when the moving direction of the object is changed, the stretch regions R4, R5 and R6 are also changed in range and orientation. In particular, the size, width, length, degree, shape, and range of the stretch region for the arrow a are varied depending on a relative distance or the like between the arrow a and the target.

FIG. 10 illustrates an example of a scaling ratio with regard to a panning direction of an image on a screen in a display device 10 according to one embodiment of the present invention. FIG. 10 shows that left and right scaling rations are different in accordance with panning directions of an object having mobility when an image is displayed by a panorama function. When there are no objects having mobility, the display device 10 processes and displays an image with a uniform ratio between the left and right sides of the screen. In FIG. 10, (a) shows that the left and right sides of the screen are subjected to scaling to have a uniformly symmetric ratio. Then, when an object having mobility appears in an image and the mobility of the image causes the panning direction of the screen to be oriented leftward, (b) shows that the right side is subjected to scaling to have a leftward compression effect, thereby providing stereoscopic effect to a user. Further, when the panning direction of the screen is oriented rightward, (c) shows that the left side is subjected to scaling to have a rightward compression effect, thereby providing stereoscopic effect to a user. Although one side of the screen is subjected to scaling, scaling may be performed by a certain ratio at regular intervals of the screen, and an increasing or decreasing scaling ratio may be differently set. When left-side scaling of the screen is increased, the scaling may be performed by a certain ratio in accordance with the regions of the screen, or the scaling ratio may be gradually changed, and the scaling may be performed in various ways.

Figure 11:
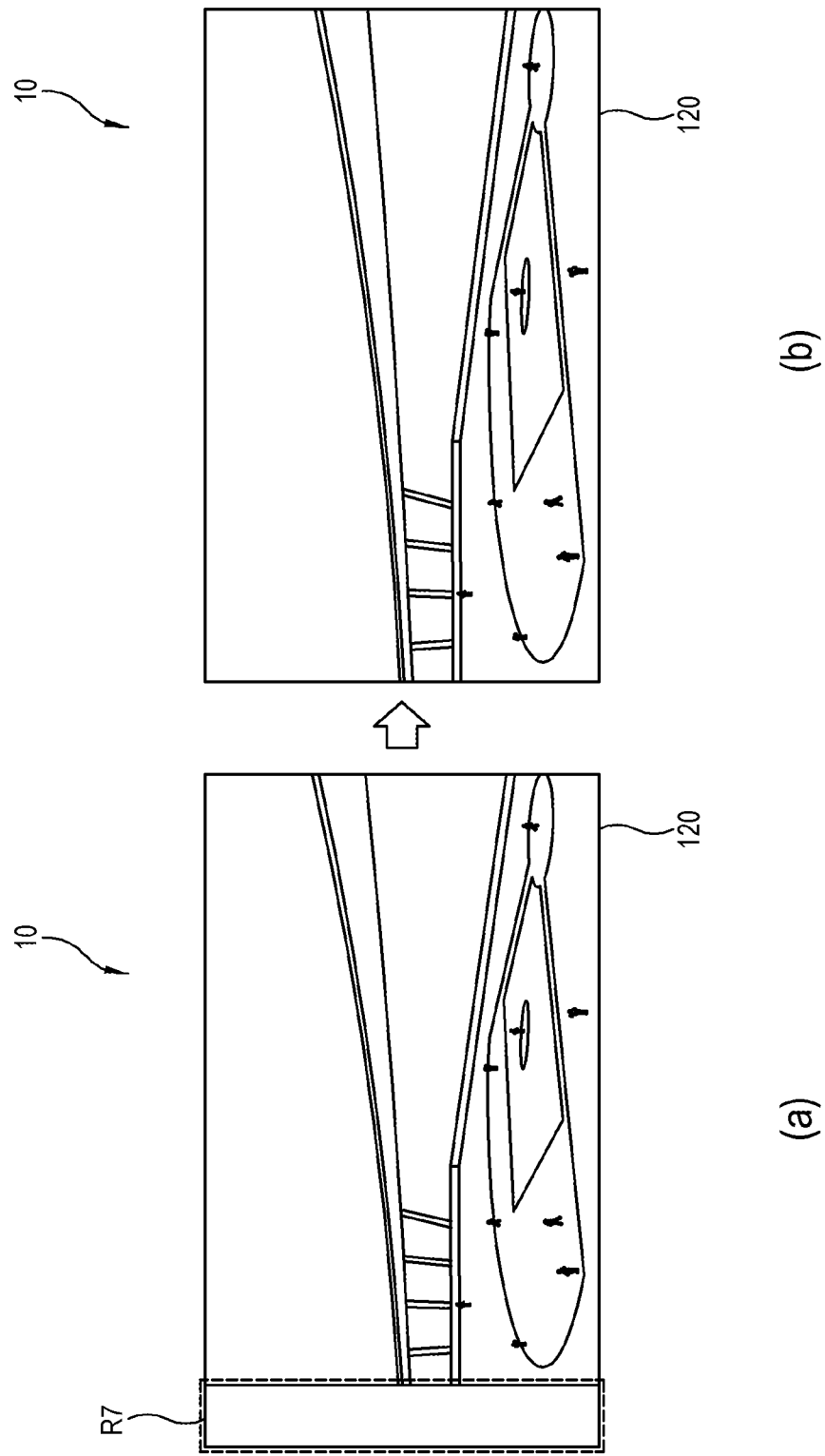
FIG. 11 illustrates an example where a screen region is stretched in a direction of a baseball moving in an image having a ratio of 16:9 displayed in a display device having an aspect ratio of 21:9 according to one embodiment of the present invention.

FIG. 11 illustrates an example where a screen region is stretched in a direction of a baseball moving in an image having a ratio of 16:9 displayed in a display device 10 having an aspect ratio of 21:9 according to one embodiment of the present invention. In FIG. 11, (a) shows that a black screen of a left region R7 is caused because the aspect ratio of 21:9 of the display device 10 is larger than the ratio of 16:9 of the image. Referring to FIG. 11, (a) shows a broadcast of a baseball game. FIG. 11(b) shows that a baseball thrown by a pitcher is hit by a hitter to at least an outfield in the broadcasted baseball game, and the scaling ratio of the left region in the image is increased by referring to a flying direction of the baseball to stretch the left region R7 of the screen in the display device 10. Like this, it is possible to more lively display the flight of the baseball by increasing the scaling ratio of the screen region in a direction where the baseball flies in consideration of the flying direction of the baseball.

Figure 12:
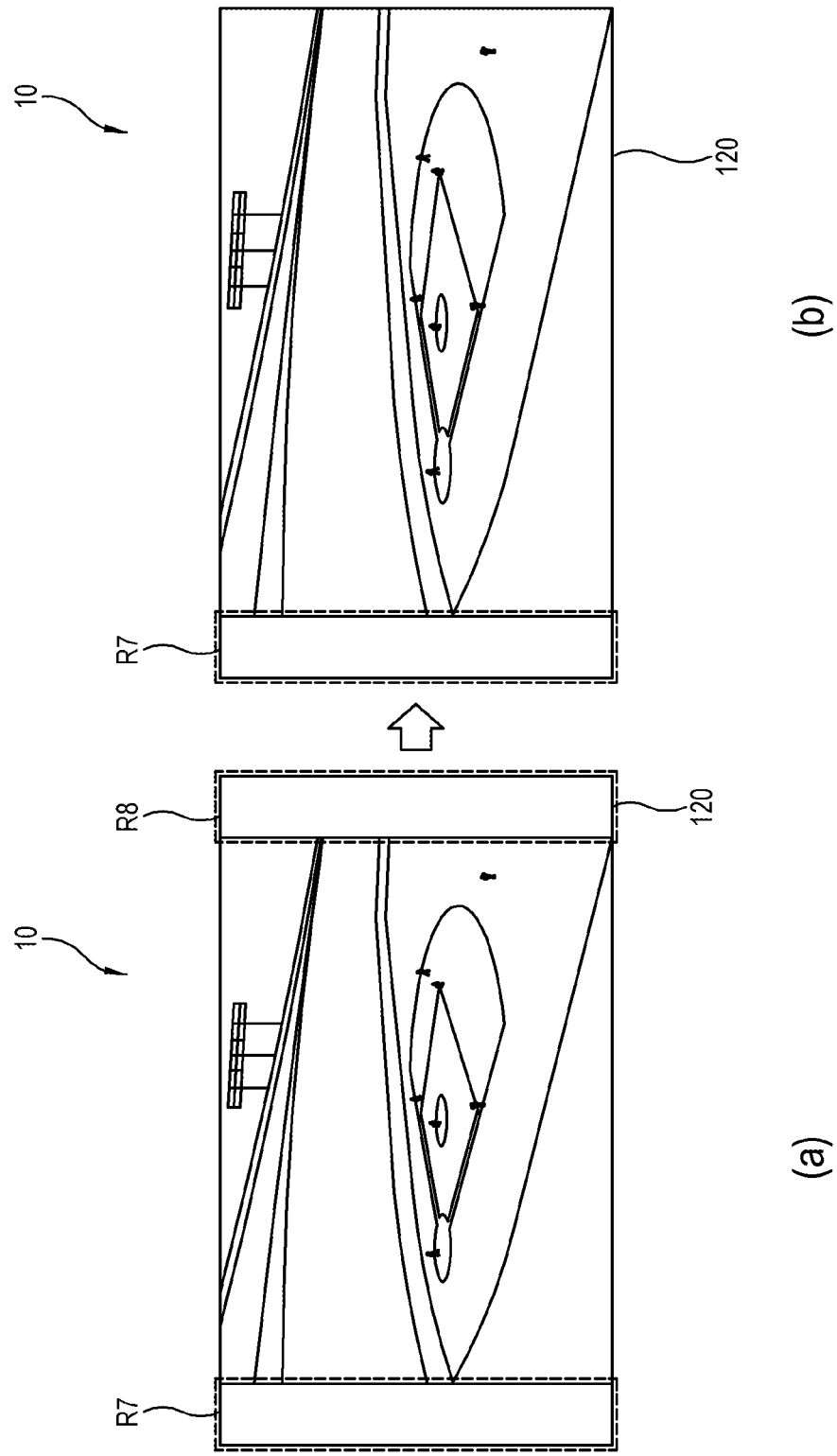
FIG. 12 illustrates an example where a screen region is stretched in a direction of a baseball moving in an image having a ratio of 4:3 displayed in a display device having an aspect ratio larger than the ratio of 4:3 according to one embodiment of the present invention.

FIG. 12 illustrates an example where a screen region is stretched in a direction of a baseball moving in an image having a ratio of 4:3 displayed in a display device having an aspect ratio larger than the ratio of 4:3 according to one embodiment of the present invention. In FIG. 12, (a) shows the left region R7 caused because the aspect ratio of the display device 10 is larger than the ratio of the image like that of FIG. 11. In addition, FIG. 12 shows a right region R8 of the black screen caused because the aspect ratio of the display device 10 is larger than the ratio of the image. In FIG. 12, (a) shows that a moving object is not present, but (b) shows that the right region is stretched as an object having mobility appears. In FIG. 12, (b) shows that a baseball thrown by a pitcher is hit by a hitter to at least an outfield (i.e. rightward) in the broadcasted baseball game, and the scaling ratio of the right region in the image is increased by referring to a flying direction (i.e. a rightward direction) of the baseball. Thus, the image of the baseball broadcast is stretched in the right direction of the screen in the display device 10, and displayed on the black screen of the right region R8. Herein, to more enhance a flying effect of the baseball, the baseball broadcast image may be moved toward the region R7 and the right region of the screen may be more stretched in (b) of FIG. 12. This may be performed by a preset criterion for changing the ratio of the image.

Figure 13:
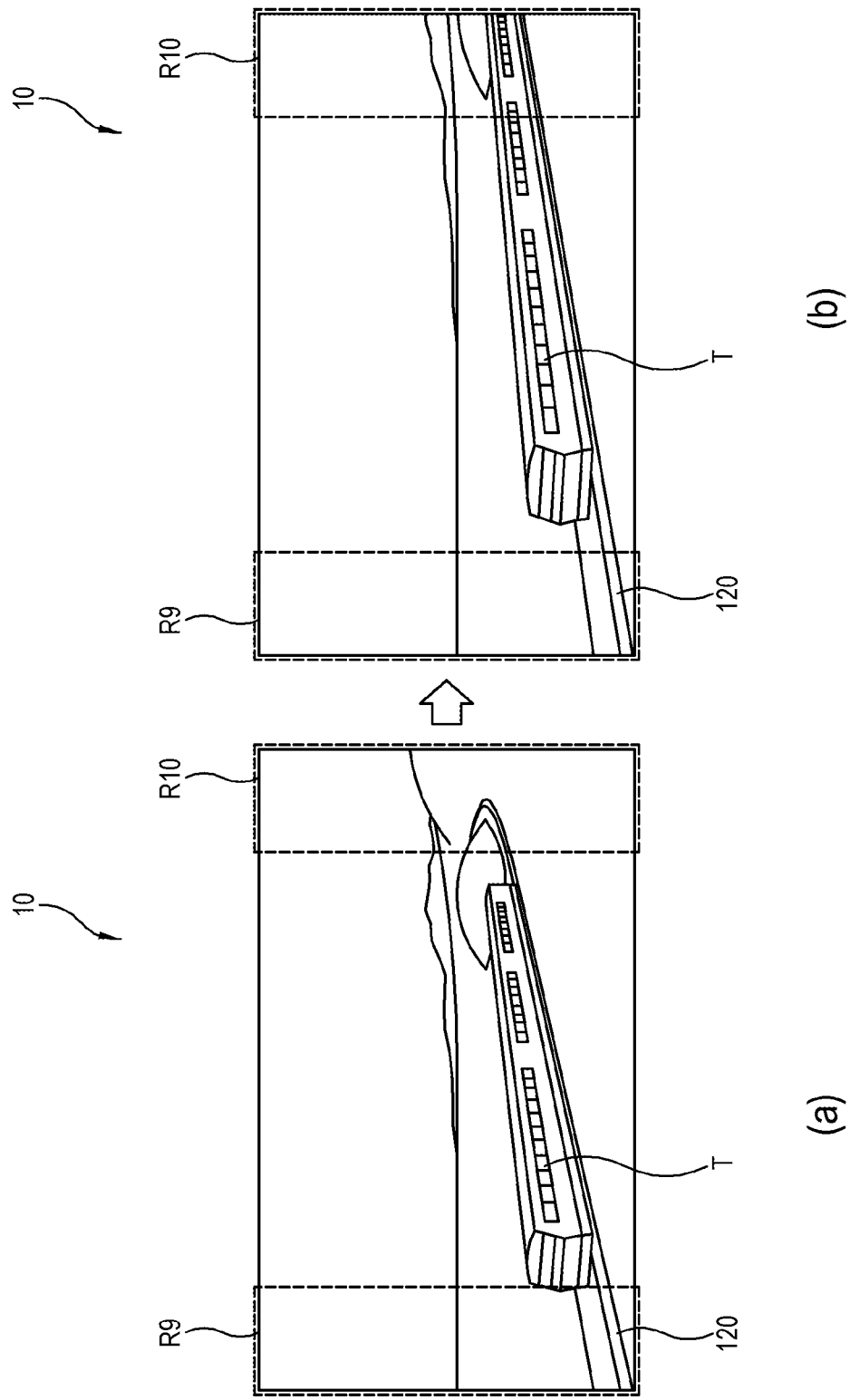
FIGS. 13 and 14 illustrate examples of adjusting a stretching degree with regard to left and right regions on a screen in a display device according to one embodiment of the present invention.
Figure 14:
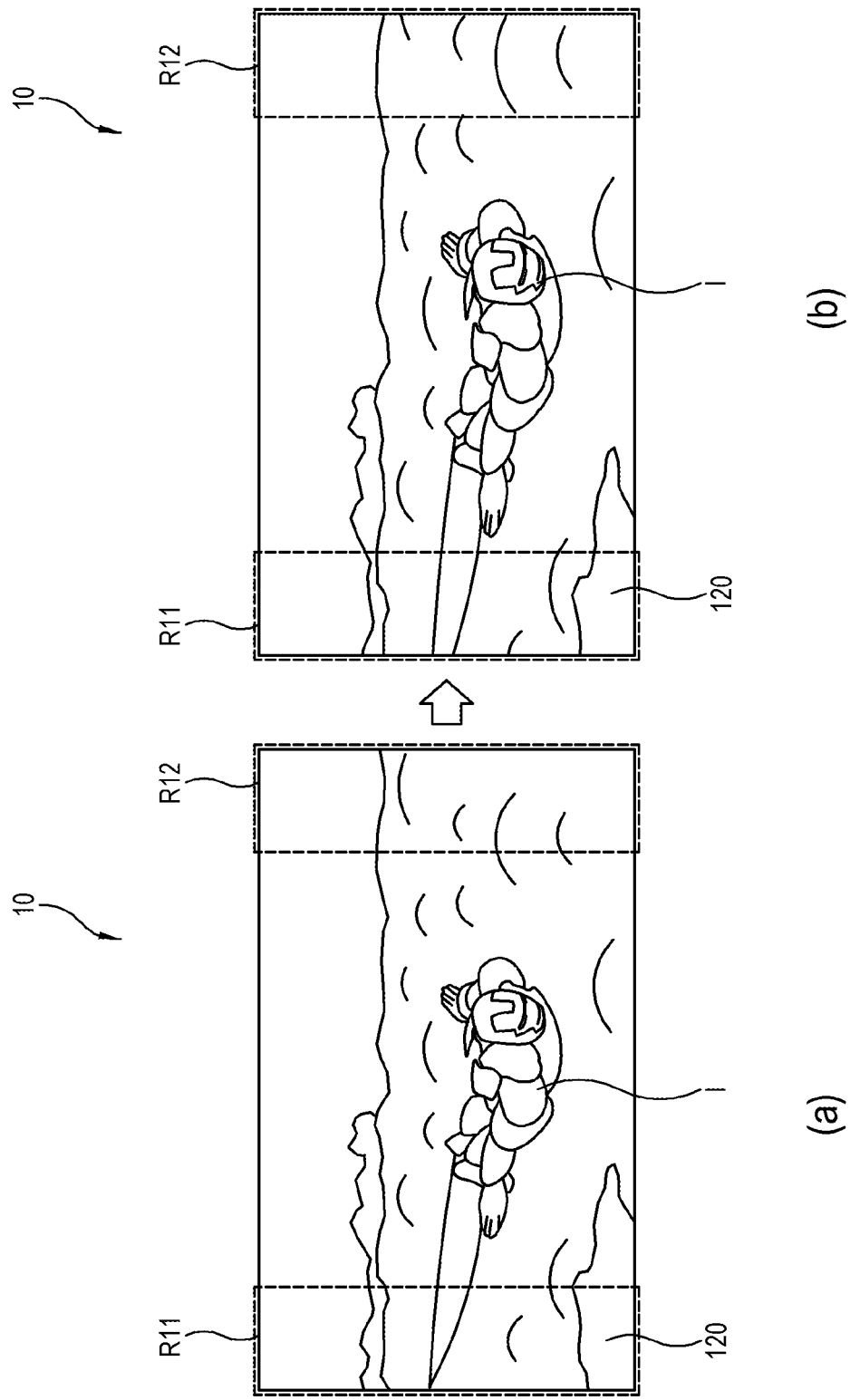

FIGS. 13 and 14 illustrate examples of adjusting a stretching degree with regard to left and right regions on a screen in a display device 10 according to one embodiment of the present invention. In FIG. 13, (a) shows a train runs on a rail. There are a region R9 at a left side and a region R10 at a right side. In FIG. 13, (b) shows that the left region R9 and the right region R10 are stretched to increase movement effect of the train as the object having mobility, i.e. the train appears in an image. Referring to (b) of FIG. 13, a stretching degree in the right region R10 is greater than that in the left region R9. Herein, the object having mobility, i.e. the train is also subjected to scaling so that a front portion of the train is bigger than a rear portion so that the mobility of the train can be more effectively represented. Therefore, a user can view the dynamic movement of the train.

Referring to FIG. 14, (a) shows a moving object shaped like a robot. There are a region R11 at a left side and a region R12 at a right side. In FIG. 14, (b) shows that the left region R11 and the right region R13 are stretched to increase movement effect of the train as the object having mobility, i.e. the train appears in an image. Referring to (b) of FIG. 14, a stretching degree in the right region R12 is greater than that in the left region R11. By taking the orientation of the object shaped like a robot into account, the scaling ratio is decreased in the forward direction of the robot-shaped object, and the scaling ratio is increased in an opposite direction to a forwarding direction of the robot-shaped object.

Figure 15:
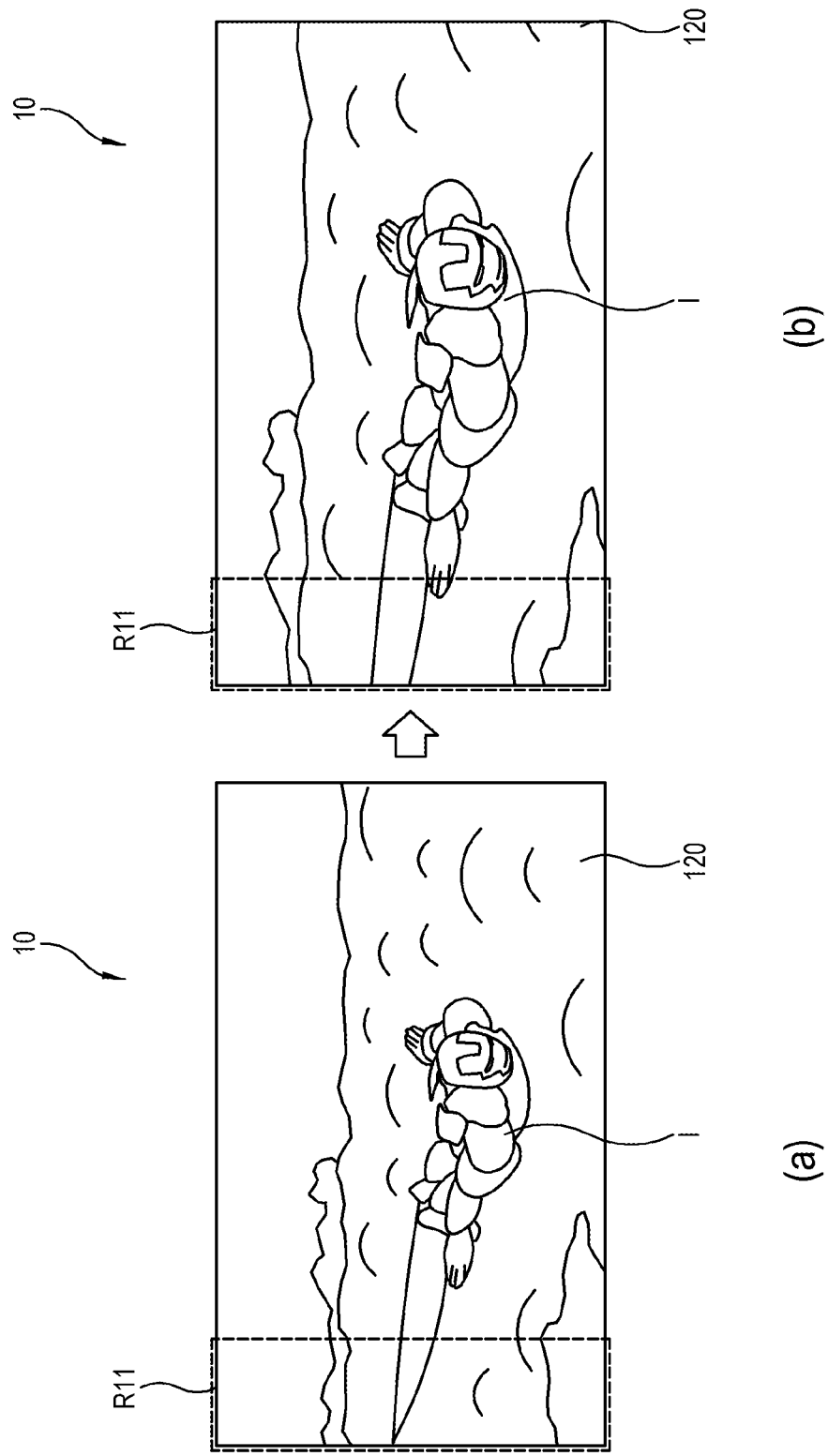
FIGS. 15 and 16 illustrate examples of stretching an object and a region of an opposite direction to the forwarding direction of the object moving on a screen in a display device according to one embodiment of the present invention.

FIG. 15 illustrates an example of stretching an object and a region of the opposite direction to the forwarding direction of the object moving on a screen in a display device 10 according to one embodiment of the present invention. FIG. 15 shows that the left region R11 of FIG. 14 is stretched and the robot-shaped object I is more stretched than that of FIG. 14. With this, a user can experience the stereoscopic effect increased by asymmetry when more stretching the robot-shaped object I as shown in FIG. 15 rather than displaying the unstretched robot-shaped object I moving in the image without change. Referring to FIG. 15, the robot-shaped object I is more stretched to have an effect on the left region of the image, thereby correspondingly stretching the region of the opposite direction to the forwarding direction of the object.

Figure 16:
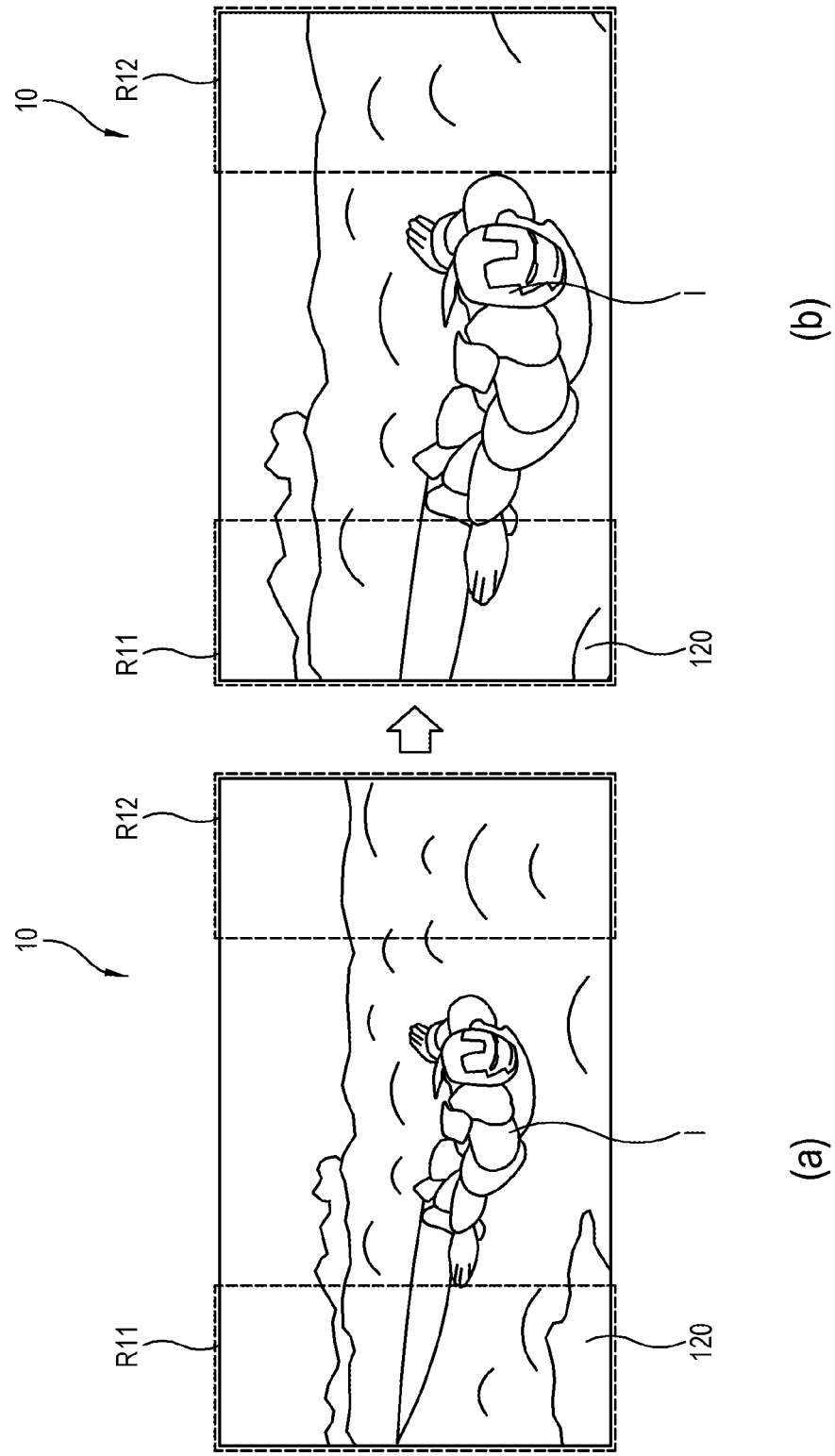

FIG. 16 illustrates an example of stretching an object and a region of the opposite direction to the forwarding direction of the object moving on a screen in a display device according to one embodiment of the present invention. FIG. 16 shows that a region is stretched more largely than the stretch region of the opposite direction to the forwarding direction of the moving object I and the stretched object I, and the stretching degree of the object I itself is increased. With this, when stereoscopic effect is given by stretching the object having mobility, the stretching degree of the region in the opposite direction to the forwarding direction of the object may be determined in accordance with the stretching size, speed and the like of the object. For example, when it is determined that the stretching degree is so high that the stretched size of the object is higher than a preset size, the stereoscopic effect of the image may be enhanced by further increasing the stretching degree of the region in the opposite direction to the forwarding direction of the object. When it is determined that the speed of the object having mobility is faster than a preset moving speed in the image, the stereoscopic effect of the image may be enhanced by further increasing the stretching degree of the region in the opposite direction to the forwarding direction of the object. FIG. 16 shows that the object I is stretched, and the region in the opposite direction to the forwarding direction of the object is stretched in accordance with the stretching size and speed of the object.

Figure 17:
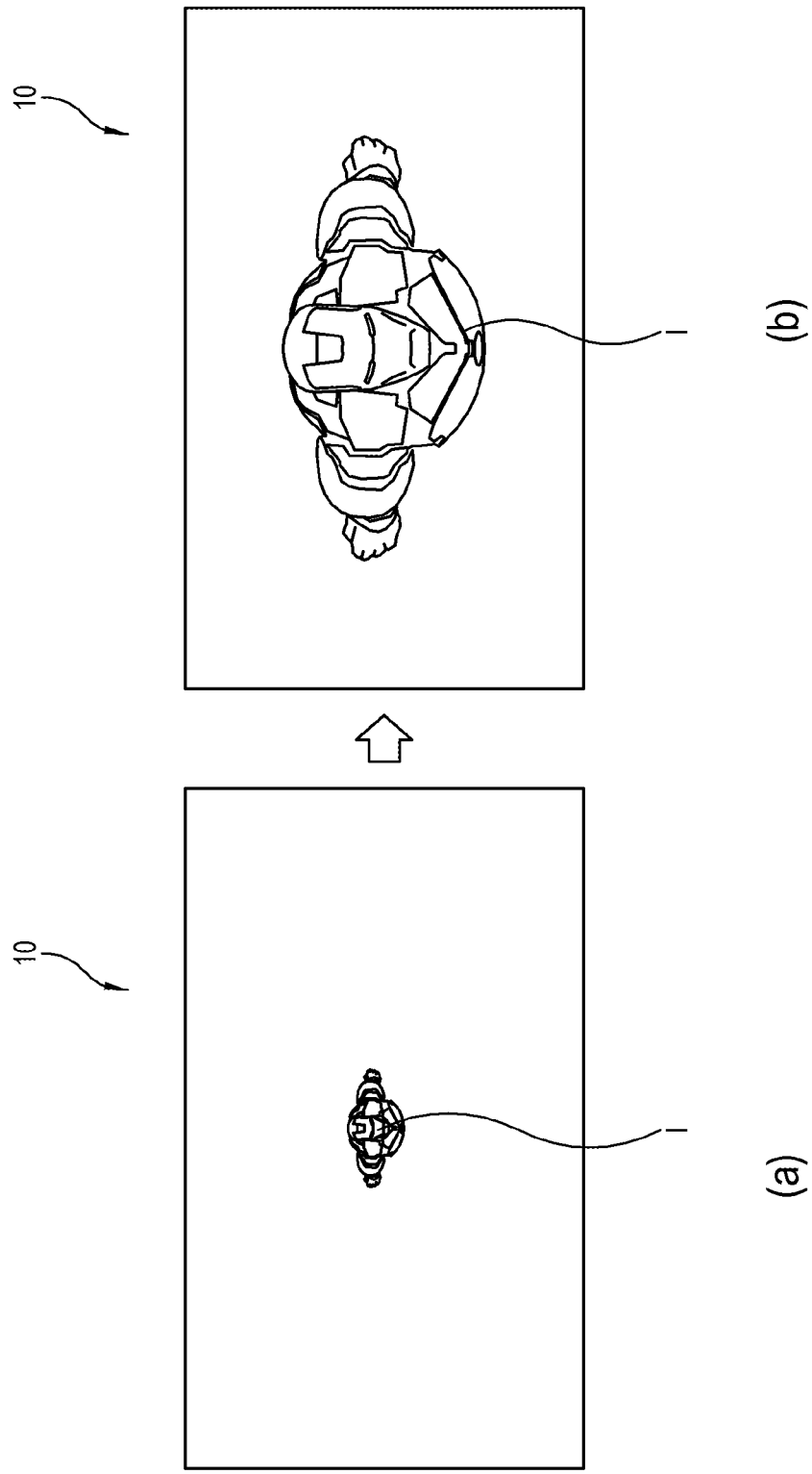
FIG. 17 illustrates an example of stretching an object when the object moves in a depth direction on a screen in a display device according to one embodiment of the present invention.

FIG. 17 illustrates an example of stretching an object I when the object moves in a depth direction on a screen in a display device 10 according to one embodiment of the present invention. Even when the object I moves from a distance toward a user on the screen of the display device 10, the object I may be stretched to add the stereoscopic effect. In the image, the object I becomes bigger as moving from a distance in the depth direction toward a user. However, when the object I is stretched by increasing a degree of enlarging the object I in accordance with movement of the object I, a user may feel as if the object I moves much faster toward the user. Thus, a user may feel as if the approaching object I moves and becomes larger. Herein, as the object I moves from a distance in the depth direction toward a user, the stereoscopic effect may be enhanced by increasing the degree of stretching the object I. When the object I is stretched and the left and right regions of the object I are also stretched, it may be achieved by preset settings or only the object may be stretched to enhance the stereoscopic effect. When the object I moves in the depth direction, the object I is stretched but the left and right regions are reduced without stretch, thereby emphasizing the object I. Since the object I is stretched, the object I and the left and right regions may be adjusted with regard to at least one of brightness, light and shade, chroma, and color, thereby making a user feel enhanced stereoscopic effect.

Figure 18:
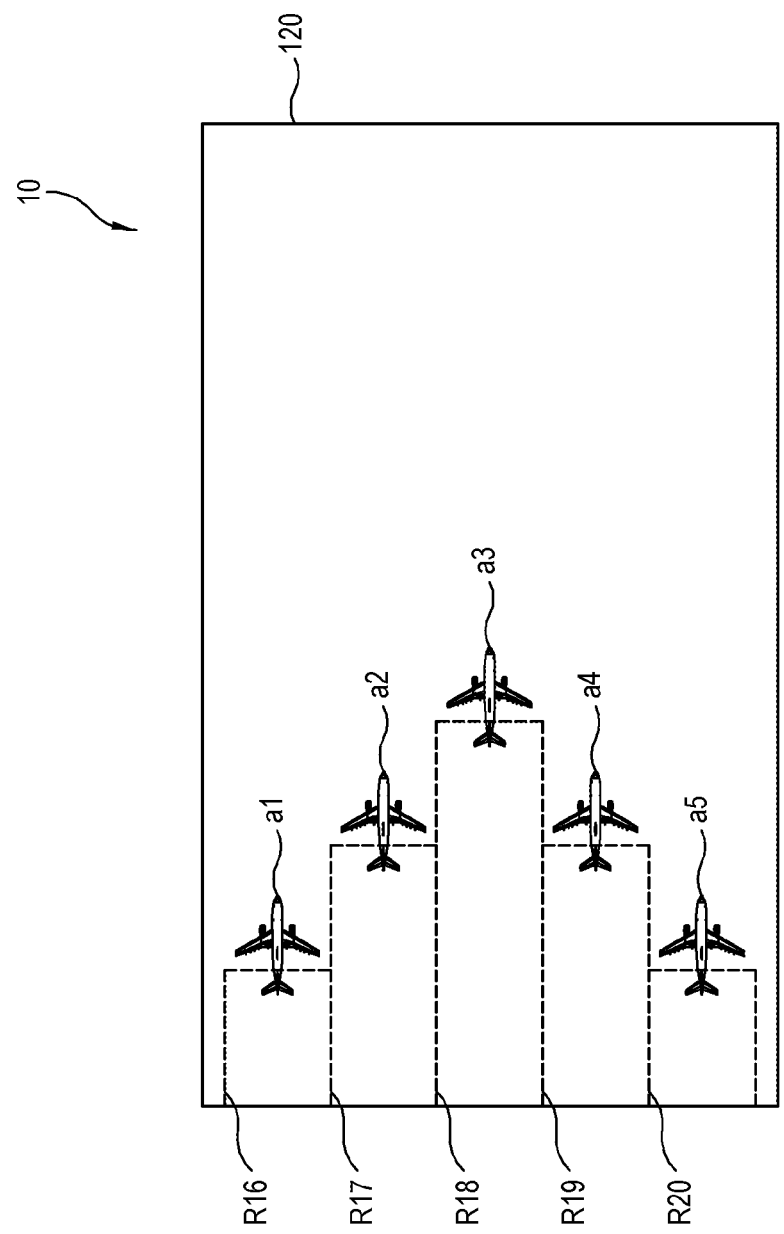
FIGS. 18 and 19 illustrate examples of stretch regions with regard to a plurality of objects having mobility on a screen in a display device according to one embodiment of the present invention.
Figure 19:
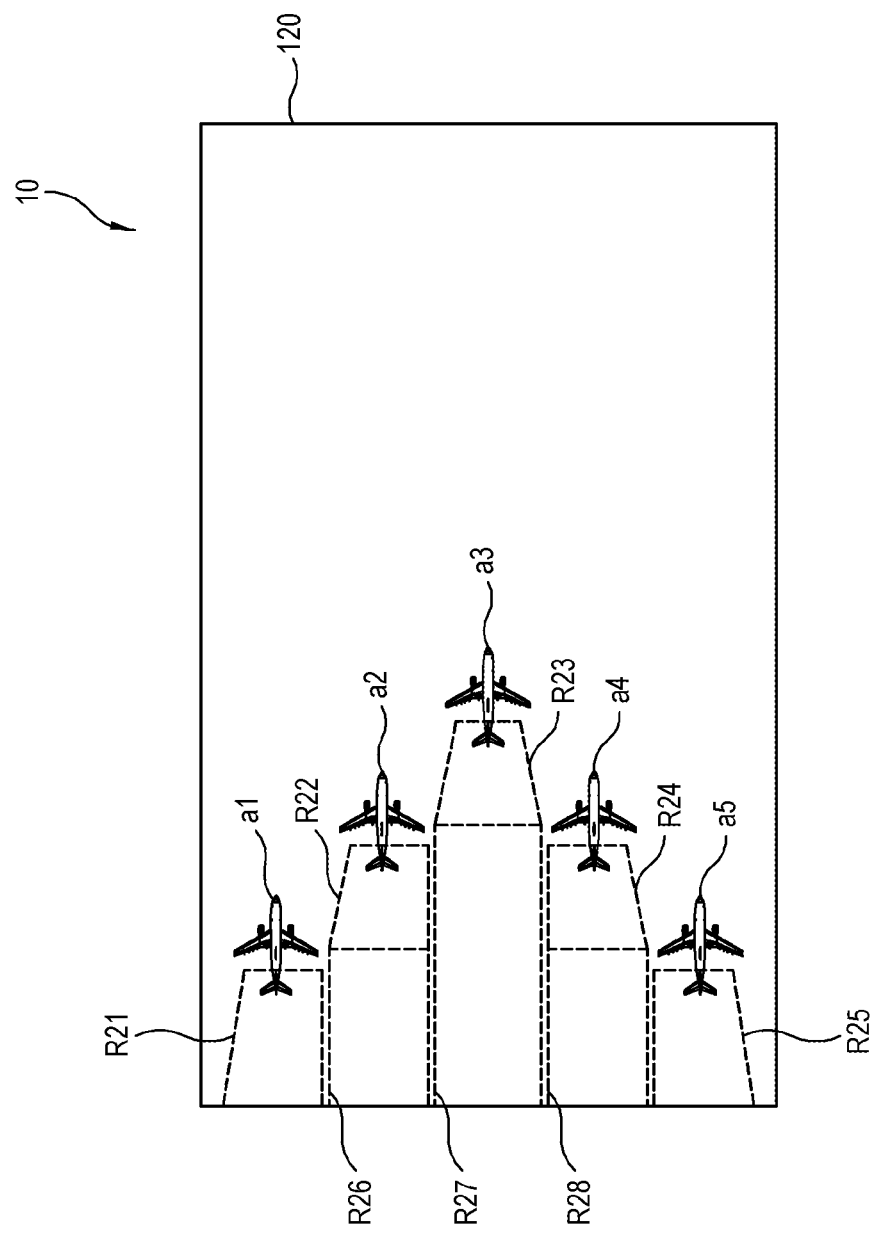

FIGS. 18 and 19 illustrate examples of stretch regions with regard to a plurality of objects having mobility on a screen in a display device 10 according to one embodiment of the present invention. When a plurality of objects and regions are present having mobility in an image, each region may be stretched corresponding to each moving direction of the plurality of objects and regions. FIG. 18 shows aircrafts as the plurality of objects a1, a2, a3, a4 and a5 having mobility. The plurality of objects a1, a2, a3, a4 and a5 moves rightward from the left side of the screen. The aircrafts move from left to right flying in formation, and the controller 100 of the display device 10 determines the moving direction and stretches the left region, i.e. the rear region of the aircraft in an opposite direction to the moving direction. The regions R16, R17, R18, R19 and R20 corresponding to the respective aircrafts may be stretched and displayed. Thus, the stereoscopic effect is enhanced with regard to the formation flight of the aircrafts. A region may be set to be larger than each vertical width of the aircrafts a1, a2, a3, a4 and a5, i.e. the objects having mobility but not intrude the vertical width of another aircraft. As shown in FIG. 18, when the plurality of objects a1, a2, a3, a4 and a5 are moving, the stretch region for the foremost moving object a3 may be set up to the whole vertical width of the screen. On the other hand, when the stretch region is displayed with regard to each object, the stretch regions are set not to overlap with each other. However, when the effect is enhanced even though the stretch regions are overlapped with each other, the stretch regions may be previously set to overlap with each other. In addition, the stretch region of each object to be moved has to be determined with regard to the vertical width and the backward length. For instance, when the aircraft moves from the left side and approximately reaches the right side, it may be determined whether to stretch the region up to the backward, i.e. left screen end of the aircraft, apply different stretching degrees according to sections, stretch only a partial region, etc. thereby stretching the stretch region. Referring to FIG. 18, all the rear regions of the objects having mobility, i.e. the aircrafts a1, a2, a3, a4 and a5 are stretched.

Unlike the rectangular stretch regions shown in FIG. 18, FIG. 19 illustrates that the stretch region is set and displayed by combination of the trapezoidal stretch region and the rectangular stretch region. In this case different from the stretch region of FIG. 18, the stretch regions are hardly likely to overlap with each other, thereby enhancing the stereoscopic effect with regard to each aircraft. As shown in FIG. 19, the mobility of each aircraft may be improved by increasing difference between the top and bottom of the trapezoid. The plurality of regions to be stretched may be different in at least one of the stretching degree, the shape and the range. The plurality of regions to be stretched may be stretched by at least one of the stretching degree, the shape and the range. The plurality of regions to be stretched may be stretched by at least two of the stretching degree, the shape and the range.

Figure 20:
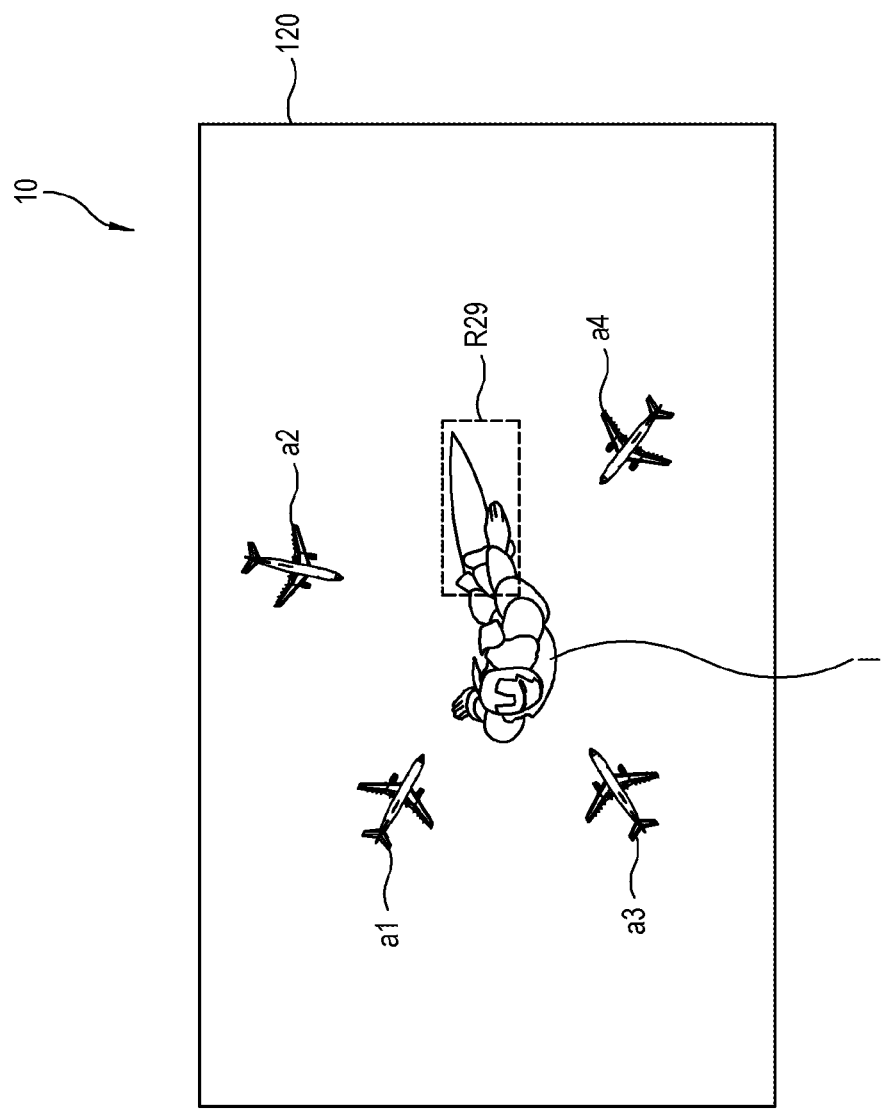
FIG. 20 illustrates an example of stretching only a partial region of one object focused among a plurality of objects moving in different directions from one another on a screen in a display device according to one embodiment of the present invention.

FIG. 20 illustrates an example of stretching only a partial region of one object focused among a plurality of objects moving in different directions from one another on a screen in a display device 10 according to one embodiment of the present invention. FIG. 20 shows a plurality of objects a1, a2, a3, a4, and I. In this image, the object I is focused, and only the rear region of the object I is stretched. The embodiment of FIG. 20 is given by way of example, in which the stretch region may be determined with regard to one focused object since it may become very complicated when the stretch regions are set and stretched with regard to all objects when there are many unfocused moving objects. When the plurality of objects generally move in similar directions, the stretch region may be set and stretched with regard to each of the object. When the plurality of objects respectively move in different directions, the stretch region may be set and stretched with regard to a focused object. There may be many cases with regard to the plurality of objects, and there are no limits to a certain case. Preferably, the stretch region may be set not to confuse a user.

Figure 21:
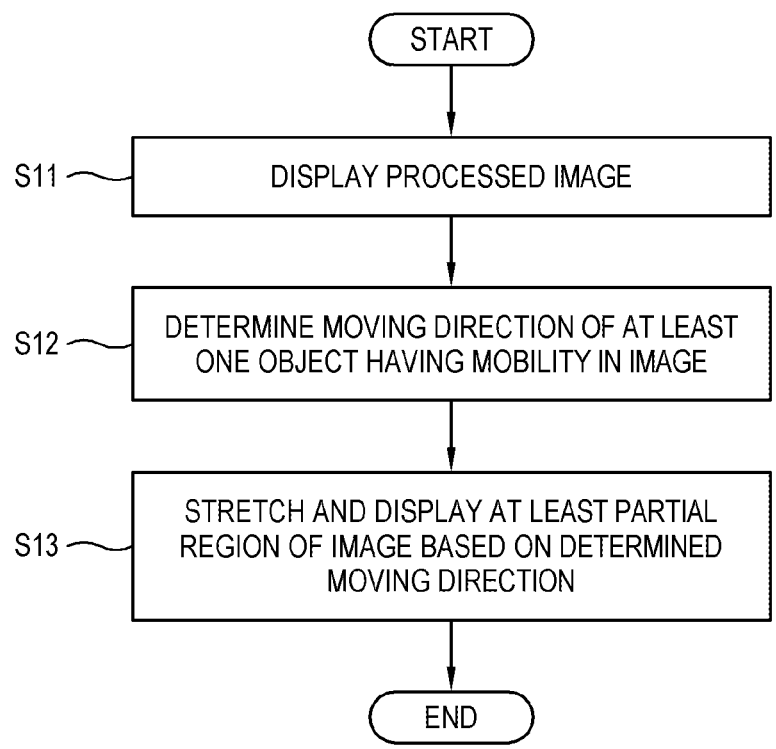
FIG. 21 is a control flowchart of showing operations of a display device according to one embodiment of the present invention.

FIG. 21 is a control flowchart of showing operations of a display device 10 according to one embodiment of the present invention. An image processed in the image processor 110 is displayed on the display 120 (S11). A moving direction of at least one object having mobility in the image displayed on the display 120 is determined (S12). At least a partial region of an image is stretched and displayed based on the determined moving direction (S13).

Figure 22:
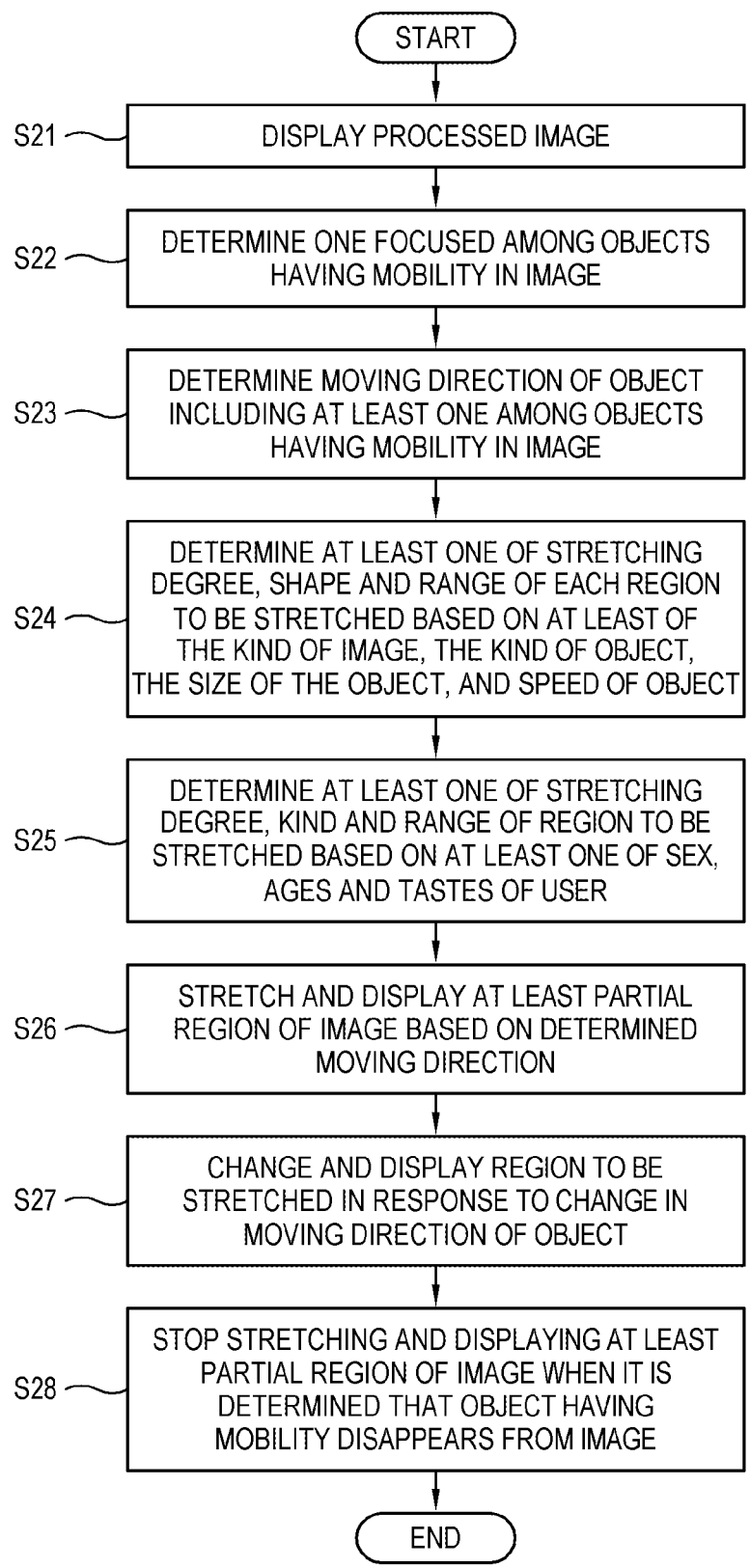

FIG. 22 is a control flowchart of showing operations of a display device 10 according to one embodiment of the present invention. An image processed in the image processor 110 is displayed on the display 120 (S21). One to be focused among regions and objects having mobility in the image displayed on the display 120 is determined (S22). A moving direction of a focused object having mobility, which includes at least one of regions and objects having mobility in the image displayed on the display 120 is determined (S23). At least one of a stretching degree, shape and range of a region to be stretched is determined based on at least of the kind of image, the kind of object having mobility, the size of the object having mobility, and the speed of the moving object (S24). At least one of a stretching degree, kind and range of a region to be stretched is determined based on at least one of sex, ages and tastes of a user (S25). Based on the moving direction determined in the operation S23, the region to be stretched is stretched and displayed with the stretching degree, shape and range determined in the operations S24 and S25 (S26). The region to be stretched is changed and displayed in response to change in the moving direction of the object having mobility (S27). When it is determined that the region and object having mobility disappear from the image, at least a partial region of the image is stopped from being stretched and displayed (S28).

FIG. 23 is a control flowchart of showing operations of a display device 10 according to one embodiment of the present invention. An image processed in the image processor 110 is displayed on the display 120 (S31). It is determined whether there are a plurality of objects and regions having mobility in the image displayed on the display 120 (S32). Each moving direction of the plurality of objects and regions having mobility in the image displayed on the display 120 is determined (S33). At least one of a stretching degree, shape and range of a region to be stretched is determined based on at least one of the kind of image, the kind of object having mobility, the size of the object having mobility, and the speed of the object having mobility (S34). At least one of the stretching degree, kind and range of the region to be stretched is determined based on at least one of sex, ages and tastes of a user (S35). The region to be stretched is stretched and displayed by adjusting at least one of brightness, light and shade, chroma, and color with regard to the stretching degree, shape and range determined in the operations S34 and S35 based on the moving direction determined in the operation S33 (S36). The region to be stretched is displayed changing in response to change in the moving direction of the object having mobility (S37). When it is determined that the region and the object having mobility disappear from the image, at least a partial region of the image is stopped from being stretched and displayed (S38). By the display device 10, the direction of the moving object is determined and the region of the object having mobility is stretched to make the screen asymmetric, thereby enhancing the movement effect and stereoscopic effect of the object having mobility in the image.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

The invention claimed is:

1. A display device comprising:
   an image processor configured to process an image;
   a display configured to display the image processed by the image processor; and
   a controller configured to:
      determine a focused object having mobility in the image from among a plurality of objects having mobility in the image;
      determine a moving direction of the focused object having mobility in the image;
      control the image processor to stretch only a partial region of the image corresponding to the focused object based on the determined moving direction of the focused object; and
      control the display to display the stretched partial region of the image.

2. The display device according to claim 1, wherein the controller is configured to:
   determine at least one among a stretching degree, a shape, and a range of the partial region based on at least one among a kind of the image, a kind of the focused object, a size of the focused object, and a speed of the focused object.

3. The display device according to claim 1, wherein the controller is configured to:
   change the partial region based on a change in the moving direction of the focused object.

4. The display device according to claim 1, wherein the controller is configured to:
   control the image processor to gradually increase at least one of a stretching degree and a range for a plurality of partial regions of the image based on the moving direction of the focused object.

5. The display device according to claim 1, wherein the controller is configured to:
   control the image processor to stretch at least the partial region of the image by a preset ratio with regard to the focused object.

6. A method of controlling a display device, the method comprising:
   displaying a processed image;
   determining a focused object having mobility in the image from among a plurality of objects having mobility in the image;
   determining a moving direction of the focused object having mobility in the image;
   stretching only a partial region of the image corresponding to the focused object based on the determined moving direction of the focused object; and
   controlling the display device to display the stretched partial region of the image.

7. The method according to claim 6, further comprising:
   determining at least one of a stretching degree, a shape, and a range of the partial region based on at least one among a kind of the image, a kind of the object, a size of the focused object, and a speed of the focused object.

8. The method according to claim 6, further comprising:
   changing the partial region based on a change in the moving direction of the focused object.

9. The method according to claim 6, further comprising:
   gradually increasing at least one of a stretching degree and a range for a plurality of partial regions of the image based on the moving direction of the focused object.

10. The method according to claim 6, wherein the stretching comprises:
    stretching the partial region of the image by a preset ratio with regard to the focused object.

* * * * *